(12) United States Patent
Sigge et al.

(10) Patent No.: US 11,958,744 B2
(45) Date of Patent: Apr. 16, 2024

(54) METHOD AND DEVICE FOR PRODUCING AMMONIA OR HYDROGEN AND USE OF THE DEVICE

(71) Applicants: THYSSENKRUPP INDUSTRIAL SOLUTIONS AG, Essen (DE); thyssenkrupp AG, Essen (DE)

(72) Inventors: Sebastian Sigge, Castrop-Rauxel (DE); Klaus Nölker, Dortmund (DE); Steffen Jahn, Soest (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 538 days.

(21) Appl. No.: 17/261,206

(22) PCT Filed: Jul. 18, 2019

(86) PCT No.: PCT/EP2019/069312
§ 371 (c)(1),
(2) Date: Jan. 19, 2021

(87) PCT Pub. No.: WO2020/016333
PCT Pub. Date: Jan. 23, 2020

(65) Prior Publication Data
US 2021/0276863 A1  Sep. 9, 2021

(30) Foreign Application Priority Data

Jul. 20, 2018  (DE) .................. 10 2018 117 657.0

(51) Int. Cl.
*C01B 3/02* (2006.01)
*C01B 3/34* (2006.01)
*C01C 1/04* (2006.01)

(52) U.S. Cl.
CPC ............... *C01B 3/025* (2013.01); *C01B 3/34* (2013.01); *C01C 1/0452* (2013.01);
(Continued)

(58) Field of Classification Search
CPC ... C01B 3/025; C01B 3/34; C01B 2203/0233; C01B 2203/068; C01B 2203/0833;
(Continued)

(56) References Cited

U.S. PATENT DOCUMENTS 4,545,976 A * 10/1985 Osman .................... C01B 3/382
                                                              252/373
2004/0042951 A1  3/2004 Lippmann
(Continued)

FOREIGN PATENT DOCUMENTS

DE           225 029 A      7/1985
DE        100 57 863 A      5/2002
(Continued)

OTHER PUBLICATIONS

English Translation of International Search Report issued in PCT/EP2019/069312, dated Oct. 21, 2019.

*Primary Examiner* — Anthony J Zimmer
*Assistant Examiner* — Syed T Iqbal
(74) *Attorney, Agent, or Firm* — thyssenkrupp North America, LLC

(57) ABSTRACT

An apparatus for producing ammonia or hydrogen may include a) a gas stream feed conduit having a connecting conduit to a steam reformer with a waste heat section; b) a heat exchanger downstream of the gas stream feed conduit; c) a gas stream preheater downstream of the heat exchanger; d) a recirculation conduit which is located downstream of the gas stream preheater and leads to the gas stream feed conduit or, upstream of the heat exchanger, to the connecting conduit; and e) the steam reformer with the waste heat section, where the waste heat section may be in thermal contact with the gas stream preheater and the flow of the gas stream which has been heated in the gas stream preheater through the recirculation conduit can be regulated. A process
(Continued)

for producing ammonia or hydrogen may employ such an apparatus.

11 Claims, 2 Drawing Sheets

(52) U.S. Cl.
CPC ............... *C01B 2203/0233* (2013.01); *C01B 2203/068* (2013.01); *C01B 2203/0833* (2013.01); *C01B 2203/0883* (2013.01)

(58) Field of Classification Search
CPC .......... C01B 2203/0883; C01C 1/0452; C01C 1/0405; Y02P 20/129
See application file for complete search history.

(56) References Cited

U.S. PATENT DOCUMENTS

| | | |
|---|---|---|
| 2009/0242841 A1 | 10/2009 | Judas |
| 2016/0017802 A1 | 1/2016 | Saloway |
| 2020/0093831 A1 | 3/2020 | Geisler |

FOREIGN PATENT DOCUMENTS

| | | |
|---|---|---|
| DE | 10 2010 020 406 A | 6/2011 |
| DE | 10 2011 015 717 A | 10/2012 |
| DE | 10 2015 210 801 A | 12/2016 |
| DE | 10 2016 103 321 A | 8/2017 |
| EP | 2 155 603 B | 10/2011 |
| WO | 2018/055067 A | 3/2018 |

* cited by examiner

METHOD AND DEVICE FOR PRODUCING AMMONIA OR HYDROGEN AND USE OF THE DEVICE

CROSS REFERENCE TO RELATED APPLICATIONS

This application is a U.S. National Stage Entry of International Patent Application Serial Number PCT/EP2019/069312, filed Jul. 18, 2019, which claims priority to German Patent Application No. DE 10 2018 117 657.0, filed Jul. 20, 2018, the entire contents of both of which are incorporated herein by reference.

FIELD

The present disclosure generally relates to apparatuses and processes for producing ammonia or hydrogen.

BACKGROUND

To produce ammonia, a synthesis gas, which usually contains inert gases such as methane or noble gas in addition to hydrogen and nitrogen, is reacted in the presence of a suitable catalyst customarily in an apparatus for producing ammonia. For this purpose, the synthesis gas is fed into the apparatus and conveyed through at least one catalyst-filled reactor in which ammonia is then produced. Customary apparatuses for producing ammonia are well known from the prior art and are described, for instance, in DE 10 2015 210 801 A1, DE 100 57 863 A1 or DD 225 029 A3. The synthesis gas is usually produced in a steam reforming process. For this purpose, combustion air is fed into a steam reformer. An air preheater is optionally installed upstream of the steam reformer. It can likewise be necessary to heat the combustion air before it is introduced into the air preheater (or the steam reformer). This can occur by means of a heat exchanger (=calorifier).

The production of hydrogen is usually carried out in a plant (hydrogen plant) in which the hydrogen is obtained by steam reforming of natural gas. In the reforming process, hydrocarbons are converted into hydrogen. Carbon monoxide and carbon dioxide are obtained as by-products. Steam reforming is carried out in a steam reformer by means of an endothermic reaction. The product gas is cooled and purified in a pressure swing adsorber in order to produce very pure hydrogen. Such a process is known, for instance, from DE 10 2016 103 321 A1. DE 10 2010 020 406 A1 discloses a method for operating a reformer furnace and reformer plant. US 2016/0017802 A1 discloses a process for producing hydrogen. DE 10 2011 015 717 A1 discloses a heat recovery device.

The process conditions known from the prior art can lead to disadvantages especially when the known processes are carried out at low ambient temperatures. Thus, the combustion air can lead to icing in the calorifier (heat exchanger) at low ambient temperatures. During running-up of an apparatus for producing, for example, ammonia (=ammonia plant), temperatures in the calorifier can also go below freezing point at low ambient temperatures. This leads to problems particularly when the calorifier is operated using reaction by-products, for instance a process condensate, which are available only at the end of the start-up process. Before start-up of the calorifier, the wall temperature of the calorifier corresponds merely to the exterior temperature. If the exterior temperature is below the freezing point of the media used for operating the calorifier, for instance the abovementioned process condensate, these media can freeze. This freezing process can lead to damage to the calorifier and prevent efficient operation of the plant.

In regions in which low temperatures usually prevail, water admixed with glycol is, according to the prior art, often used to prevent freezing of a heating medium. However, the use of glycol is disadvantageous for various reasons, so that there is a need to provide an alternative to the use of glycol/water mixtures.

In addition, there is a need to provide solutions for those plants in which a heating medium which is intended to prevent freezing processes in the calorifier is available only after some time after start-up. An example of such a plant is an ammonia plant.

Thus a need exists for a process for producing ammonia which overcomes the disadvantages of the prior art and is, in particular, suitable for preventing freezing of the operating media of a heat exchanger arranged upstream of the reformer even during running-up of the ammonia plant.

DETAILED DESCRIPTION

Figure 1:
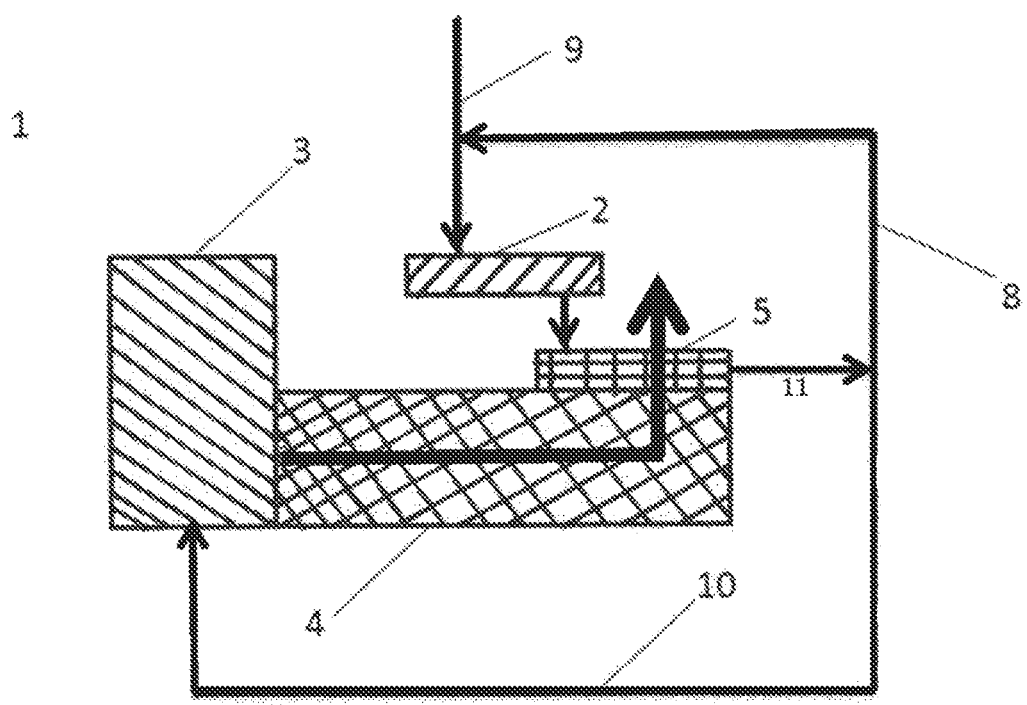
FIG. 1 is a schematic view of an example apparatus for producing ammonia or hydrogen.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, an apparatus for the production of ammonia or hydrogen comprises a) a gas stream feed conduit having a downstream connecting conduit (connected via a heat exchanger as described below and a gas stream preheater) to a steam reformer having a waste heat section, in particular with the elements described below under b) and c) being arranged between the gas stream feed conduit and downstream connecting conduit, b) a heat exchanger located downstream of the gas stream feed conduit, in particular with the downstream heat exchanger being arranged outside the waste heat section; c) a gas stream preheater, in particular air preheater, located downstream of the heat exchanger; d) a recirculation conduit which is located downstream of the gas stream preheater and leads to the gas stream feed conduit and a connecting conduit which is located downstream of the gas stream preheater and leads to the steam reformer, or a recirculation conduit which is located downstream of the gas stream preheater and upstream of the heat exchanger and leads to the connecting conduit, and e) the steam reformer with the waste heat section, where the waste heat section is in thermal contact with the gas stream preheater, in particular air preheater, and the flow of the gas stream which has been heated in the gas preheater through the recirculation conduit and thus also through the connecting conduit which is located downstream of the gas stream preheater and leads to the steam reformer can be regulated. For the purposes of the invention, the expression "gas stream preheater" preferably encompasses plate heat exchangers and shell-and-tube heat exchangers. The expression "downstream" encompasses, for the purposes of the invention, suitable tubes, channels, blowers, pumps, compressors for the transport of gases and/or liquids. Further elements not mentioned, e.g. heat exchangers, gas stream preheaters, blowers and/or compressors, can be present between the downstream elements.

In an advantageous embodiment, the apparatus further comprises a connecting conduit by means of which the heat exchanger and another part of the apparatus are connected, where the formation or presence of process condensate, boiler feed water or steam is provided in said other part of the apparatus. The process condensate mentioned can, for example, arise in an ammonia plant during cooling of the synthesis gas at a number of points in the plant. The process condensate is essentially water containing different impurities, e.g. $CO_2$. The concentrations of the impurities here are generally in a range of 0.01 mol % or less. The temperature of the process condensate is usually from about 120 to 140° C.

According to the invention, the apparatus for producing ammonia or hydrogen comprises, in addition to the constituents indicated which are essential for the invention, further typical constituents which are known and necessary for apparatuses for producing ammonia or hydrogen.

The use of the apparatus of the invention makes it possible to prevent condensate from turning into ice in the heat exchanger or prevent freezing of the means for operating the heat exchanger in the plant when exterior temperatures go below the freezing point of the means for operating a heat exchanger present in the plant (in particular the process condensate which arises in another part of the apparatus). In this way, damage to the heat exchanger can be avoided and efficient operation of the plant can be ensured. In particular, the temperature going below the dew point in the heat exchanger located upstream of the steam reformer can be prevented in a targeted manner by the recirculation of the preheated gas stream during operation of a plant for producing, for example, ammonia or hydrogen in the event of, for example, unplanned low ambient temperatures. In addition, the apparatus of the invention allows unproblematic start-up of a plant for producing, for example, ammonia or hydrogen using a steam reformer, for example primary reformer. The gas stream which has been heated by means of the waste heat section in the gas stream preheater is mixed via the recirculation conduit, which opens into the connecting conduit, with the cool gas stream obtained via the gas stream feed conduit, in general air from the outside. The gas mixture which has been heated in this way passes through the heat exchanger through which heat transfer fluid is preferably not yet conveyed, and heats the heat exchanger in the process. As soon as the heat exchanger has been sufficiently preheated in this way, it can be taken into operation without problems due to, for example, dew water formation or icing having to be feared.

According to the invention, correct operation of the heat exchanger, e.g. by means of process condensate, can, in one embodiment, be maintained by waste heat from an already continuously operating steam reformer arising at low ambient temperatures of the waste heat section being utilized for heating cool combustion air before passage through the heat exchanger. In a further embodiment, it can be provided, during start-up of the steam reformer, for the heat exchanger (=calorifier) to be taken into operation only when a preheated gas stream or combustion air stream is available as a result of thermal contact of the waste heat section of the steam reformer with the gas stream preheater or the air preheater. This gas stream is branched off downstream of the gas stream preheater or air preheater, which in one embodiment can also be arranged within the waste heat section of the steam reformer and is in thermal contact with this section, and fed to the heat exchanger. Introduction into the heat exchanger can be effected by any suitable means, for example a blower. The gas stream which has been preheated in this way is mixed with the exterior air in order to raise the entry temperature into the calorifier to above the freezing point. This makes it possible for the calorifier to be supplied with suitable means for operating the calorifier, for example a process condensate, without the temperature being able to go below the freezing point.

The heat exchanger can be one of the customary heat exchangers known from the prior art, for instance shell-and-tube heat exchangers, plate heat exchangers, etc. However, the nature of the heat exchanger is not restricted according to the invention. A combination of a plurality of heat exchanger elements can likewise be provided. Preference is given here to using shell-and-tube heat exchangers.

In a further embodiment, the apparatus can further comprise a gas blower for the connecting conduit, which blower is located upstream of the heat exchanger. The gas blower is advantageously also arranged downstream of the entry of the recirculation conduit into the connecting conduit. A particularly uniform gas stream can be produced in this way.

One unit of an apparatus according to the invention is, for the purposes of the invention, installed upstream of a further unit of this apparatus when a sequence of units arranged indirectly or directly in succession is required by the indicated regular mode of operation of this apparatus and this unit has to be located upstream of a subsequent unit in the processing sequence. For example, the gas stream feed conduit is located upstream of the heat exchanger. Here, it is immaterial whether, for example, a process fluid is present directly in the two sequential units or flows into these. Rather, for this purpose it is also sufficient for interaction to be able to occur during passage through the respective units.

The same applies to the term "located downstream". Thus, the combustion air fed via the gas stream feed conduit into the connecting conduit can flow directly through a gas blower located downstream of the gas stream feed conduit and also subsequently pass through the heat exchanger located downstream of the blower and thus interact thermally with the latter without itself at the same time flowing through, for example, the tubes of the heat exchanger which are reserved for the heat transfer fluid.

A conduit from the gas stream preheater into the recirculation conduit and the connecting conduit is preferably present. From this conduit as described, the gas flows can occur into the gas stream feed conduit and the downstream connecting conduit and optionally also be regulated by means of a suitable connecting piece (e.g. T-piece).

The object is also achieved by a process for producing ammonia or hydrogen, comprising the following steps: a) provision of an apparatus according to the invention for the production of ammonia or hydrogen, b) operation of the steam reformer and thus heating of the gas stream preheater, in particular air preheater, which is in thermal contact with the waste heat section; c) introduction of a gas stream into the gas stream preheater, in particular air preheater, via the connecting conduit in order to heat the gas stream; d) introduction of at least part of the gas stream which has been heated in the gas stream preheater, in particular air preheater, via the recirculation conduit and the connecting conduit into the heat exchanger in order to heat the heat exchanger.

In a particularly suitable embodiment, the proportion of the gas stream which is fed via the recirculation conduit and the connecting conduit to the heat exchanger is in the range from 0 to 30% by volume, preferably in the range from 3 to 25% by volume, in each case based on the total gas stream which leaves the gas stream preheater or the air preheater. The further part or the remaining part of the gas stream is then advantageously fed to the steam reformer. This gives a very energy-efficient procedure. The process of the invention using the apparatus of the invention allows the technical effects described in the above text to be achieved.

It can likewise be provided for the gas stream to be introduced by means of a gas blower into the heat exchanger. A uniform gas flow into the heat exchanger can be obtained in this way.

In a further embodiment, the gas stream can be a stream of combustion air. The use of combustion air makes an effective process procedure possible, since a gas mixture which is in any case to be used in the heat exchanger can at the same time be used to preheat the heat exchanger to a temperature suitable for operation.

In one embodiment, a process condensate can be supplied to the heat exchanger in order to operate the heat exchanger. As an alternative, boiler feed water or steam can also be employed for this purpose.

Likewise, it can be provided for the gas stream to be heated to a temperature of 5° C. or more in step c). The condensation or freezing of the means for operating the heat exchanger can be particularly efficiently prevented in this temperature range.

Finally, the object is achieved by the use of the apparatus of the invention in the case of an ambient temperature of 5° C. or less, in particular in the case of an ambient temperature of −50° C. to +5° C.

FIG. 1 schematically shows an apparatus 1 for producing ammonia according to the present invention. The apparatus 1 comprises a heat exchanger 2, a steam reformer 3 with a waste heat section 4 and an air preheater 5.

The waste heat section 4 serves to transport away heat which arises in the steam reformer 3 in order to prevent overheating of the steam reformer 3. As a result, the temperature within the waste heat section 4 is higher than ambient temperature.

The air preheater 5 is arranged so as to be in thermal contact with the waste heat section 4. In this way, it is normally ensured that the temperature in the air preheater 5 corresponds substantially to the temperature of that part of the waste heat section 4 with which thermal contact occurs (or is only slightly below this temperature), but in any case is likewise greater than the ambient temperature.

A gas stream (for example combustion air) introduced through the gas stream feed conduit 9 into the apparatus 1 is heated in the air preheater 5. This is made possible, as indicated above, by the thermal contact of the air preheater 5 with the waste heat section 4 which has been heated by operation of the steam reformer 3. The gas stream ii which has been preheated in this way in the air preheater 5 can then be fed via a recirculation conduit 8 back to the gas stream feed conduit 9 and, in an advantageous embodiment, mix there with the combustion air introduced from outside. As a result, preheated combustion air or a preheated combustion air mixture goes into the heat exchanger 2. Low temperatures in the heat exchanger 2 have been prevented by the introduction of the heated combustion air into the heat exchanger 2. For instance, freezing of a process condensate used for operating the heat exchanger 2 can be avoided in this way. As a result, the combustion or ambient air 9 can be heated by means of the flue gas waste heat from the steam reformer 4 with the apparatus of the invention. This partially preheated air can then be introduced via a conduit 11 coming from the gas stream preheater firstly partly via the conduit 8 into the cold combustion or ambient air and the remaining part can secondly be introduced via the connecting conduit 10 into the reformer 3.

Figure 2:
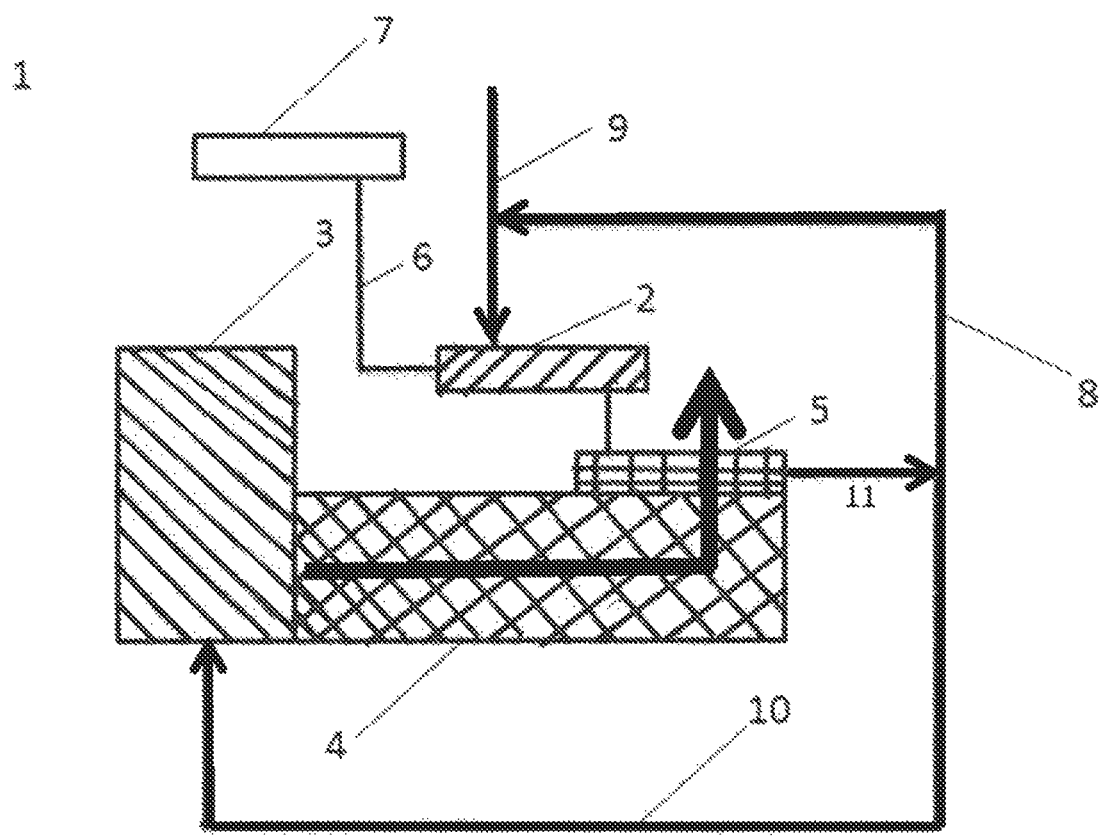
FIG. 2 is a schematic view of another example apparatus for producing ammonia or hydrogen.

The apparatus shown in FIG. 2 comprises all constituents of the apparatus of FIG. 1. There is also a connection 6 which connects the heat exchanger 2 to another part of the apparatus 7, with a process condensate being produced in the other part of the apparatus. The connection 6 between the heat exchanger 2 and the other part of the apparatus 7 is such that the process condensate can be transported from the other part 7 to the heat exchanger 2 in order to be able to take the latter into operation by introduction of the process condensate.

WORKING EXAMPLES

Further features and advantages of the process of the invention may be derived from the following detailed description of working examples.

In a conventional ammonia plant which comprises, in this order in respect of a combustion air stream fed in, a combustion air blower, a heat exchanger, an air preheater and a steam reformer having a waste heat section, with the air preheater being arranged in the waste heat section of the steam reformer, the start-up of the plant was simulated with the objective of keeping the temperature of a combustion air stream which was fed into the heat exchanger by means of the combustion air blower above 5° C. The dependence of the measures necessary for this purpose on the ambient temperature was examined.

Suitable conditions can be obtained when the load on the steam reformer was at least 80%. At an ambient temperature of −37° C., a gas temperature of 5° C. within the heat exchanger could thus be obtained when 20% by volume of the combustion air passing through the air preheater was fed by means of the combustion air blower to the heat exchanger. At an ambient temperature of −10° C., a recirculation of 7% by volume of the combustion air proved to be sufficient. The temperature in the waste heat section was about 300° C. here.

The features of the invention as disclosed in the above description and in the claims can be of significance both individually and in any combination for realization of the invention in its various embodiments.

What is claimed is:

1. An apparatus for producing ammonia or hydrogen, the apparatus comprising:
 a gas stream feed conduit that includes a downstream connecting conduit to a steam reformer having a waste heat section, wherein a heat exchanger and a gas stream preheater are disposed between the gas stream feed conduit and the downstream connecting conduit;
 the heat exchanger disposed downstream of the gas stream feed conduit and outside the waste heat section;
 the gas stream preheater located downstream of the heat exchanger;

a recirculation conduit leadings to the gas stream feed conduit and the downstream connecting conduit leadings to the steam reformer, wherein the recirculation circuit and downstream connecting circuit are disposed downstream of the gas stream preheater; and the steam reformer with the waste heat section, where the waste heat section is in thermal contact with the gas stream preheater and a flow of a gas stream that has been heated in the gas stream preheater through the recirculation conduit is configured to be regulated.

2. The apparatus of claim 1 comprising a connecting conduit that connects the heat exchanger and a part of the apparatus that is configured for the formation or presence of process condensate, boiler feed water, or steam.

3. The apparatus of claim 1 comprising a gas blower for the gas stream feed conduit, which is located at least one of upstream of the heat exchanger or downstream of an entry of the recirculation conduit into the gas stream feed conduit.

4. The apparatus of claim 1 comprising a conduit from the gas stream preheater into the recirculation conduit and the connecting conduit.

5. A process for producing ammonia or hydrogen, the process comprising:
providing an apparatus comprising:
a gas stream feed conduit that includes a downstream connecting conduit to a steam reformer having a waste heat section, wherein a heat exchanger and a gas stream preheater are disposed between the gas stream feed conduit and the downstream connecting conduit,
the heat exchanger disposed downstream of the gas stream feed conduit and outside the waste heat section,
the gas stream preheater located downstream of the heat exchanger,
a recirculation conduit leadings to the gas stream feed conduit and the downstream connecting conduit leadings to the steam reformer, wherein the recirculation circuit and downstream connecting circuit are disposed downstream of the gas stream preheater; and
the steam reformer with the waste heat section, where the waste heat section is in thermal contact with the gas stream preheater and a flow of a gas stream that has been heated in the gas stream preheater through the recirculation conduit is configured to be regulated;
operating the steam reformer and heating the gas stream preheater;
introducing the gas stream into the gas stream preheater via the gas stream feed conduit to heat the gas stream; and
introducing at least part of the gas stream that has been heated in the gas stream preheater via the recirculation conduit and the gas stream feed conduit into the heat exchanger to heat the heat exchanger.

6. The process of claim 5 comprising introducing the gas stream into the heat exchanger via a gas blower.

7. The process of claim 5 wherein the gas stream is a stream of combustion air.

8. The process of claim 5 comprising introducing process condensate, boiler feed water, or steam into the heat exchanger to operate the heat exchanger.

9. The process of claim 5 wherein the at least part of the gas stream that has been heated in the gas stream preheater is heated to a temperature of 5° C. or more.

10. The process of claim 5 wherein the at least part of the gas stream that is introduced via the recirculation conduit and the gas stream feed conduit into the heat exchanger is in a range from 0 to 30% by volume, based on a total gas stream leaving the gas stream preheater, wherein a second part of a remainder of the gas stream is fed to the steam reformer.

11. A method comprising:
providing an apparatus comprising:
a gas stream feed conduit that includes a downstream connecting conduit to a steam reformer having a waste heat section, wherein a heat exchanger and a gas stream preheater are disposed between the gas stream feed conduit and the downstream connecting conduit;
the heat exchanger disposed downstream of the gas stream feed conduit and outside the waste heat section;
the gas stream preheater located downstream of the heat exchanger;
a recirculation conduit leading to the gas stream feed conduit and the downstream connecting conduit leading to the steam reformer, wherein the recirculation circuit and downstream connecting circuit are disposed downstream of the gas stream preheater; and
the steam reformer with the waste heat section, where the waste heat section is in thermal contact with the gas stream preheater and a flow of the gas stream that has been heated in the gas stream preheater through the recirculation conduit is configured to be regulated; and
introducing a gas stream into the heat exchanger where the temperature of the gas stream is in a range of −50° C. to +5° C.

* * * * *